C. J. CRAMSEY.
NUT LOCK.
APPLICATION FILED OCT. 6, 1913.
1,121,073.
Patented Dec. 15, 1914.
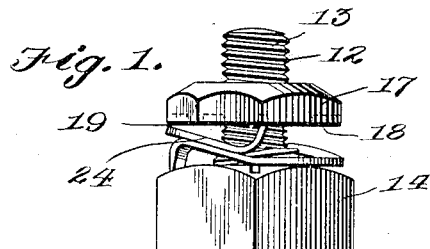
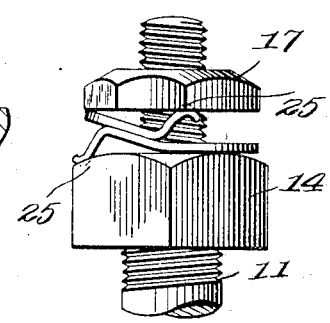
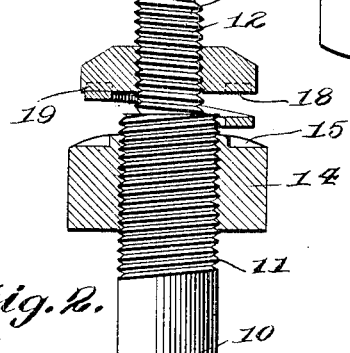
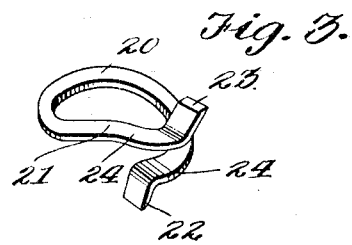
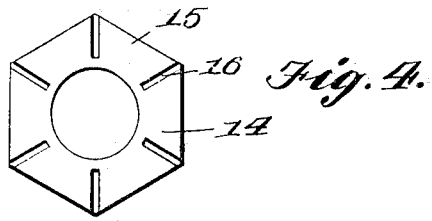
Inventor
Charles J. Cramsey
Witnesses
By
Attorney

UNITED STATES PATENT OFFICE.

CHARLES J. CRAMSEY, OF ALLENTOWN, PENNSYLVANIA.

NUT-LOCK.

1,121,073.    Specification of Letters Patent.    Patented Dec. 15, 1914.

Application filed October 6, 1913. Serial No. 793,617.

*To all whom it may concern:*

Be it known that I, CHARLES J. CRAMSEY, citizen of the United States, residing at Allentown, in the county of Lehigh and State of Pennsylvania, have invented certain new and useful Improvements in Nut-Locks, of which the following is a specification.

This invention relates to an improvement in nut locks.

The primary object of the invention is to provide a nut lock which will effectually support a nut against displacement and which, at the same time, will not necessitate the use of removable locking keys or a complicated pawl and ratchet mechanism.

A further object of the invention is to provide a construction which, while effectually holding the nut against rotation in one direction, will permit the nut to be tightened, and in which the locking mechanism may be conveniently removed when it is desired to remove the nut.

A still further object of the invention is to provide a structure in which the locking means will be effectually housed where it will not be displaced, and in which the housing of said means is accomplished without providing the nut with a chamber or recess, which not only weakens the nut but adds materially to the cost of manufacture.

In the accompanying drawings: Figure 1 is a side elevation, the nut being shown in locked position. Fig. 2 a longitudinal section. Fig. 3 a perspective view of the locking member. Fig. 4 a detail view of the work engaging nut. Fig. 5 a view showing a modified form of pawl.

Corresponding and like parts are referred to in the following description and indicated in all the views of the accompanying drawings by the same reference characters.

In the drawings, 10 designates the bolt which adjacent its terminal is provided with right-hand threads 11. The bolt is formed with a reduced extension 12 provided with left-hand threads 13. The nut 14, after the bolt has been inserted through the members which are to be clamped together, is placed on the threaded portion 11 of the bolt. The face 15 of the nut is formed with a plurality of radially disposed notches 16, the function of which will be hereinafter described. The reduced extension 12 receives a smaller nut 17, it being understood that in the assembling of the nuts on the bolt, the same are turned in opposite directions. The face 18 of the nut 17 is formed with a plurality of radially disposed notches 19.

The locking means which is interposed between the nuts, consists of a flat strip of resilient material 20 which is bent to embrace the bolt. The extremities of the strip are bent obliquely with respect to the body portion and toward each other, as indicated at 21, the terminals being again bent in opposite directions to lie at substantially obtuse angles to the obliquely directed portions of the strip, whereby the terminals will extend longitudinally of the bolt to engage the notched faces of the nuts. The terminals of the split ring, formed by bending the strip about the bolt, are spaced, and, as the nut 17 is moved toward the nut 14, said terminals will be forced toward each other, the pawls 22 and 23 formed by bending the ends of the strip, thus resiliently engaging the notched faces of the nuts, exerting a constant pressure and preventing the same from being rotated in a direction to effect their removal.

Particular attention is called to the configuration of the terminals of the locking member when in locked position. It will be seen that when the terminals are drawn together, the obliquely disposed portions 24 will contact, the pressure of the nuts, when rotated, thus forcing the pawls 22 and 23 into engagement with the nuts. The terminals are not directly interposed between the contacting faces of the nuts, but have a resilient contact with each other between the nuts, allowing for the tightening of the nuts, but at the same time preventing their removal.

It has been found in practice that when spring washers are interposed between nuts and each end of the washer arranged to contact with both of the nuts, the terminals are either distorted or broken off, rendering the washer ineffective as a means for locking the nuts against displacement. It will be noted in the present construction, that the terminals of the locking member overlap and contact with each other. This structure while providing an effectual locking means, gives the pawls sufficient resiliency to permit the nuts to be tightened.

It will be seen that when the locking member is in position between the nuts, the same will not project beyond the side faces of the nuts where it will be displaced by contact with a wrench or other tool used to tighten the nuts. Thus, the locking means is housed without providing the nut with a recess or chamber.

It is obvious that when it is desired to remove the bolt, the locking member may be bent out of engagement with the nuts by a wrench or other tool, and the nuts removed from the bolt.

The many advantages of a construction of this character will be clearly apparent as it will be noted that the same may be easily and economically manufactured and that the various parts may be readily assembled.

In Fig. 5 of the drawings, the locking means consists of a flat resilient member, the terminals of which constitute pawls. The terminals are curved, their rounded faces engaging in the notches of the nuts and preventing the displacement of the nuts. This structure is particularly adapted where it is desired to remove the nut without destroying the locking member.

Having thus described the invention, what is claimed as new is:

1. A nut lock including a bolt having reversed threaded portions, nuts engaging the bolt and provided with notches, and a locking member interposed between the nuts, said member including a split ring embracing the bolt, the extremities of said ring being bent obliquely to the body portion thereof and toward each other, said obliquely directed portions overlapping and bearing against each other in the operative position of the locking member, the terminals of the ring being bent in opposite directions and disposed to engage the notches formed in the nuts.

2. A nut lock including a bolt, a stationary member positioned upon the bolt, a nut screw threaded upon the bolt and coacting with said member, the confronting faces of the nut and the member being provided with notches, and a locking member interposed between the nut and said first mentioned member, said locking member including a split ring embracing the bolt, the extremities of said ring being bent obliquely to the body portion thereof and toward each other, said obliquely directed portions overlapping and bearing against each other in the operative position of the locking member, the terminals of the ring being bent in opposite directions and disposed to engage the notches formed in the nut.

In testimony whereof I affix my signature in presence of two witnesses.

CHARLES J. CRAMSEY. [L. S.]

Witnesses:
 MICHAEL J. GALLAGHER,
 WILLIAM J. CRAMPSEY.

Copies of this patent may be obtained for five cents each, by addressing the "Commissioner of Patents, Washington D. C."